United States Patent [19]
Hoshiba et al.

[11] Patent Number: 6,086,435
[45] Date of Patent: Jul. 11, 2000

[54] IGNITION TIMING CONTROL FOR MARINE ENGINE

[75] Inventors: Akihiko Hoshiba; Kazuhiro Nakamura, both of Hamamatsu, Japan

[73] Assignee: Sanshin Kogyo Kahushiki Kaisha, Japan

[21] Appl. No.: 09/111,843

[22] Filed: Jul. 8, 1998

[30]     Foreign Application Priority Data

Jul. 8, 1997   [JP]   Japan .................................... 9-182583

[51] Int. Cl.⁷ ................................................ B63H 21/22
[52] U.S. Cl. ................................ 440/1; 440/84; 440/87
[58] Field of Search ............................. 440/1, 2, 84, 85, 440/86, 87, 900

[56]             References Cited

U.S. PATENT DOCUMENTS

| | | |
|---|---|---|
| 4,606,315 | 8/1986 | Tobinaga et al. . |
| 4,790,279 | 12/1988 | Tobinaga et al. . |
| 5,070,840 | 12/1991 | Kanno et al. . |
| 5,172,669 | 12/1992 | Nakamura . |
| 5,176,117 | 1/1993 | Motose et al. . |
| 5,219,398 | 6/1993 | Nonaka et al. . |
| 5,450,828 | 9/1995 | Sakamoto et al. . |
| 5,476,426 | 12/1995 | Nakamura et al. . |
| 5,566,657 | 10/1996 | Hosoe ....................................... 440/87 |
| 5,579,736 | 12/1996 | Nakamura et al. . |
| 5,653,208 | 8/1997 | Nakamura . |
| 5,694,909 | 12/1997 | Kato . |
| 5,699,766 | 12/1997 | Saito . |
| 5,715,793 | 2/1998 | Motose . |
| 5,775,297 | 7/1998 | Koike et al. . |

*Primary Examiner*—Stephen Avila
*Attorney, Agent, or Firm*—Knobbe, Martens, Olson & Bear LLP

[57]             ABSTRACT

The present invention is an ignition control system for an engine having an ignition system. The ignition control system is arranged to determine if a speed of the engine is decreasing at greater than a predetermined rate, and if so, to initiate an ignition timing compensation mode in which target engine speeds during the time of deceleration are set. These target engine speeds are compared to the actual engine speed and a firing timing of the ignition is advanced if the actual engine speed is less than the target speed and the firing timing of the ignition system is delayed if the actual engine speed exceeds the target speed.

25 Claims, 9 Drawing Sheets

IGNITION TIMING CONTROL FOR MARINE ENGINE

FIELD OF THE INVENTION

The present invention is an ignition timing control for a marine engine.

BACKGROUND OF THE INVENTION

Watercraft are often powered by an inboard or outboard motor. The motor includes a water propulsion device, such as a propeller, which is powered by an internal combustion engine. The engine has an output shaft which drives the water propulsion device.

Normally, the engine drives the propeller via a transmission. The transmission permits the engine to drive the propeller in reverse and forward directions, or not at all when in a neutral position. The transmission includes a clutch which permits shifting between the various drive positions.

Fuel is supplied to the engine with a fuel system. In one arrangement, fuel is supplied to air passing through an intake pipe with a carburetor. The operator of the watercraft controls the speed of the engine with a throttle control. The throttle control controls both the carburetor and a throttle valve, thereby controlling the fuel supply rate and air flow rate. In this manner, the operator controls the speed of the engine.

As is well known in this arrangement, when the operator rapidly closes the throttle valve when the engine speed is relatively high, the air flow rate decreases faster than the engine speed. Until the engine speed drops, the pumping action of the engine may draw fuel from the carburetor. This excessive fuel delivery may cause engine backfire and foul any exhaust catalyst associated with the engine.

To reduce this problem, the throttle control includes a damping or delay member, such as a pneumatic cylinder. This damping member prevents the throttle valve too rapidly in relation to movement of the throttle control by the operator.

FIG. 9 illustrates the relationship between throttle control movement and engine speed in this arrangement. Line 1 represents throttle angle (as controlled by the throttle control), while line 2 represents ideal engine speed. The tine ΔTd represents the time during which changes in engine speed are delayed in relation to the movement of the throttle control. This arrangement has the benefit that the engine speed is reduced gradually even when the throttle control is closed quickly, reducing the probability of the engine drawing excessive fuel from the carburetor.

A detriment to this arrangement, however, is that no matter how fast the operator closes the throttle valve, the engine speed will only reduce to idle at a gradual rate. If the engine speed has not reduced sufficiently between the time the operator closes the throttle valve and when the transmission is shifted, the transmission may engage or disengage harshly. This is a common problem when the throttle control and shift lever are integrated into the same control.

As one attempt to remedy this problem, the timing of the start of the damping or delay mechanism may be advanced, as illustrated by line 3 in FIG. 9. This arrangement has the problem that the engine speed does not reduce as desired. On the other hand, if the timing of the damping mechanism is delayed, the engine speed may fall below the desired speed, as illustrated by line 4 in FIG. 9. This might result in stalling of the engine or the like.

An engine control is desired which overcomes the above-stated problems.

SUMMARY OF THE INVENTION

The present invention is an ignition control system for an engine having an ignition system. Preferably, the engine is of the type having an output shaft arranged to drive a water propulsion device through a transmission.

The ignition control system is arranged to determine if a speed of the engine is decreasing at greater than a predetermined rate, and if so, to initiate an ignition timing compensation mode in which target engine speeds during the time of deceleration are set These target engine speeds are compared to the actual engine speed and a firing timing of the ignition is advanced if the actual engine speed is less than the target speed and the firing timing of the ignition system is delayed if the actual engine speed exceeds the target speed.

In one arrangement, the compensation mode ends after a predetermined amount of time elapses. In another arrangement, the compensation mode ends when a throttle valve associated with the engine is moved towards an open position.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention relates to an ignition system of an engine. Preferably, the ignition system is associated with an engine used in a marine application, such as for powering an outboard motor. The invention comprises an ignition timing control for such an ignition. Those of skill in the art will appreciate that the ignition system of the present invention may be used with engines adapted for use in other applications.

Figure 1:
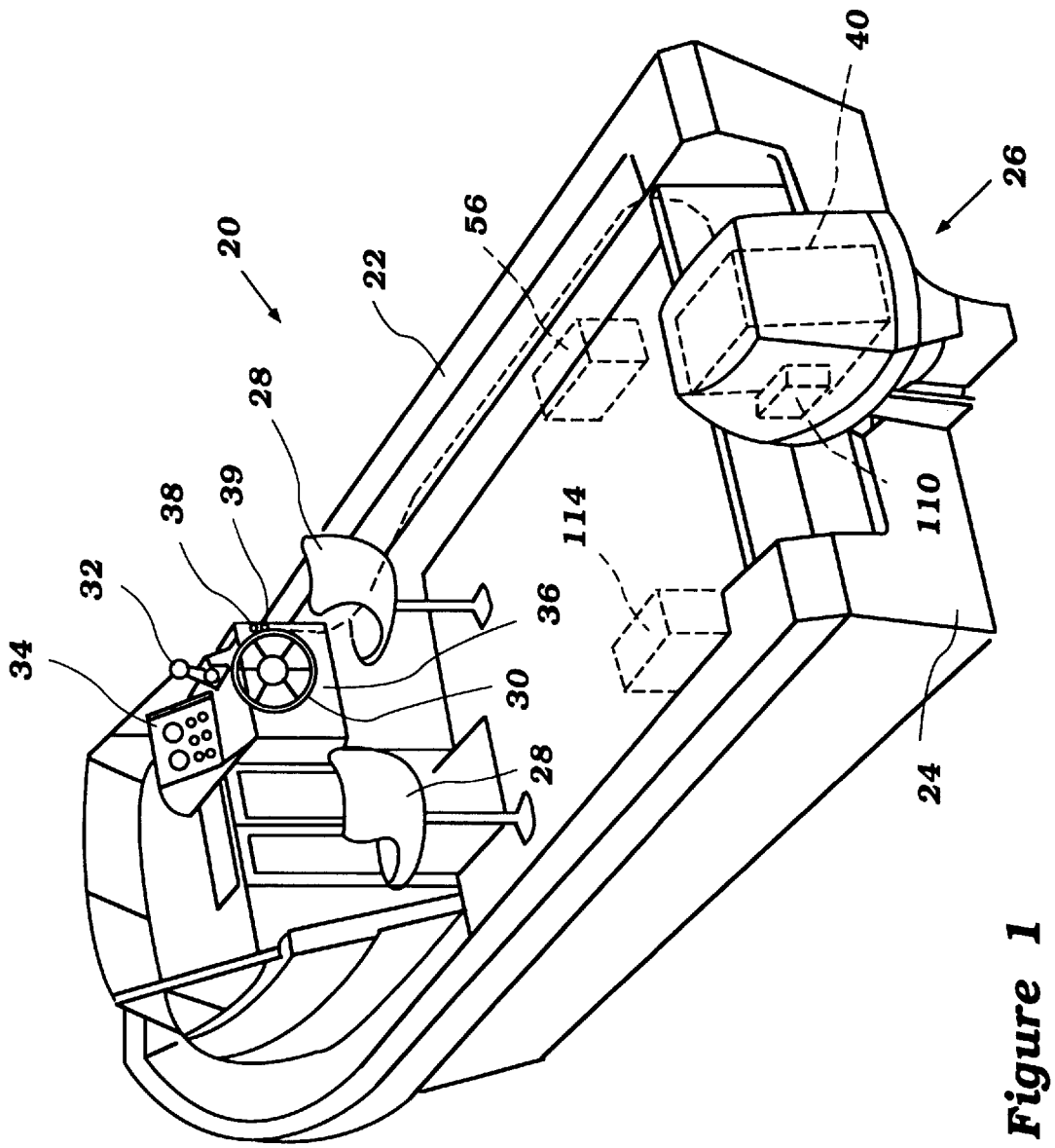
FIG. 1 is a perspective view of a watercraft propelled by an outboard motor.

Referring to FIG. 1, there is illustrated a watercraft 20. The watercraft 20 illustrated is a power boat, may comprise any number of other types of crafts. The watercraft 20 has a hull 22 with a transom portion 24 to which is mounted an outboard motor 26. The outboard motor 26 is utilized to propel the watercraft 20. As known to those skilled in the art, the motor 26 may also be of the inboard type.

When of the outboard variety, the motor 26 is connected to the watercraft 20 in a manner which allows it to pivot up and down in a vertical plane ("trimming") and rotate left and right in a horizontal plane ("steering") in a manner well known to those skilled in the art.

The watercraft 20 illustrated includes a pair of seats 28. One of the seats 28 is preferably positioned near a steering wheel 30. The steering wheel 30 is connected remotely to the outboard motor 26 for effectuating movement of the motor left and right for steering the craft. Additionally, a throttle control such as a handle 32 is preferably positioned near the steering wheel 30 for use in controlling the speed of the watercraft 20 by changing the speed of the engine powering the motor 26 (as described below).

Preferably, this handle 32 simultaneously serves as a shift control lever for controlling the position of a transmission 74 associated with the motor 26 and as a throttle control. In general, such a control is arranged so that in one position of the handle 32, the transmission 74 is set to neutral and the engine to an idle speed, in a range of positions the transmission 74 is moved to a forward drive position and the engine may be operated from idle to a high speed, and in yet another range of positions the transmission 74 is moved to a reverse drive position and the engine may again be operated between an idle speed and a high speed.

A control panel 34 is preferably provided near the steering wheel 30, the control panel 34 having one or more gauges, meters or other displays for displaying various information to the user of the watercraft 20. These displays may display watercraft speed and the like. A switch panel 36 is also provided near the steering wheel 30. The switch panel 36 preferably includes one or more switches or controls, such as a main switch 38 and a kill switch 39.

Referring still to FIG. 1, the motor 26 has a water propulsion device, such as a propeller (not shown) which is powered by an engine 40. The engine 40 is preferably mounted within a cowling of the motor 26. Of course, the engine 40 may be of the "inboard" variety as known to those in the art The engine 40 may be arranged in a variety of configurations, such as in-line, "V" or opposed, may operate on a two or four-cycle principle, and be of the rotary, reciprocating piston or other type. Preferably, the engine 40 has four cylinders (and thus four combustion chambers) each having a piston reciprocally mounted therein and attached to a crankshaft and operates on a four cycle principle. The engine 40 is oriented within the cowling so that the crankshaft is generally vertically extending and in driving relation with the water propulsion apparatus of the motor 26.

The outboard motor 26, including the engine 40, will be described in more detail with reference to FIG. 2. As illustrated, the engine 40 has a body 42 which defines the cylinders 44. A piston 46 is reciprocally mounted in each cylinder 44. The piston 46 is connected to a crankshaft 48 with a connecting rod 50. A combustion chamber is defined above the piston 46 in the cylinder 44.

Air is supplied to the combustion chamber through an intake system which includes an intake pipe 52. The intake pipe 52 leads from an air intake to the combustion chamber. A throttle valve 54 is arranged to control the air flow through the intake pipe 52. Preferably, the throttle valve 54 comprises a plate which is rotatably mounted in the intake pipe 52. The throttle valve 54 is moveable to a first position in which it is closed or generally closed for operating the engine 40 at an idle speed, and an open position in which the speed of the engine 40 is high. As described above, the position of the throttle valve 54 is preferably controlled remotely by the operator of the watercraft 20 with the handle 32 through an appropriate linkage which includes a mechanism which is arranged, at least in some range of positions, to close the throttle valve 54 at a rate which differs from the rate of movement of the handle 32.

A fuel system supplies fuel for combustion with the air in the combustion chamber. The fuel system includes a fuel supply, such as a fuel tank 56 mounted in the watercraft 20. The fuel system delivers fuel from the supply to one or more charge formers. As illustrated, the charge former comprises a carburetor 58 associated with the intake pipe 52 and arranged to deliver fuel into the air passing through the intake pipe 52. As illustrated, a separate intake pipe 52 and carburetor 58 are provided for each cylinder 44. Common intake pipes and carburetors may be used for all cylinders 44, however, as is known. Preferably, the rate of fuel delivery by the carburetor is governed by the throttle control which also controls the throttle valve 54.

The flow of air and fuel into the combustion chamber is regulated in a timed manner with an intake valve 60. This valve 60 selectively opens and closes the passage leading into the combustion chamber as controlled by a camshaft 62 or similar mechanism The position of the throttle valve 60, and thus the speed of the engine 40, is preferably controlled by the operator of the watercraft 20 remotely with the throttle/shift lever 32.

As described in detail below, combustion of the air and fuel mixture in the combustion chamber is initiated with a spark plug 64 or other ignition device. The spark plug 64 is controlled with an ignition timing system in accordance with the present invention.

The products of combustion are routed from the combustion chamber to a point external to the outboard motor 26 through an exhaust system. This exhaust system includes an exhaust passage leading from the combustion chamber to an exhaust pipe 66. An exhaust valve 68 controls the flow of exhaust to the exhaust pipe 66 in a timed manner. As with the intake valve 60, the exhaust valve 68 is preferably controlled by a camshaft 70 or similar mechanism. The exhaust is routed from the exhaust pipe 66 to a point external to the motor 26.

The intake and exhaust camshafts 62,70 may be driven by the crankshaft 48 of the engine 40, by separate motors or in other manners well known to those of skill in the art. In addition, the intake and exhaust camshafts may comprise a single common camshaft The crankshaft 48 of the engine 40 is preferably vertically extending and is arranged to drive a drive shaft 72. The drive shaft 72 selectively drives the water propulsion device of the motor 26 through a transmission 74. As illustrated, the water propulsion device comprises a propeller 76.

A drive gear 78 is mounted on the drive shaft 72. A forward gear 82 and reverse gear 84 associated with the transmission 74 and mounted on a common shaft 80 to the propeller 76 may be moved into selective engagement with the drive gear 78 with a dog clutch 86. The transmission 74 is also arranged so that neither the forward or reverse gears 82,84 engage the drive gear 78 (i.e. a neutral position).

As illustrated, the transmission 74 is controlled with a shift rod 88. The shift rod 88 is controlled by the shift/throttle lever 32 mounted in the watercraft 20 via a control cable 90 or other linkage.

Though not illustrated in detail, the engine 40 preferably includes a liquid cooling system. This system includes means, such as a pump, for supplying coolant from a coolant supply to one or more water jackets 94. Preferably, the cooling system is arranged to draw water from the body of water in which the watercraft 20 is operating for use as the coolant in the cooling system.

A lubricating system provides lubricant to various portions of the engine 40. This system includes a lubricant or oil supply, such as in a reservoir 98 and means for delivering the lubricant from the supply through one or more passages 100. In the arrangement illustrated, the means for delivering comprises an oil pump 102 which is driven directly by the crankshaft 48.

A variety of sensors are associated with the motor 26. Preferably, a temperature sensor 96 is associated with the one of the water a jackets 94 for sensing the temperature of the coolant therein. An oil pressure sensor or switch 104 monitors the pressure of the lubricant in the lubricating system. A shift position switch 106 monitors the position of the shift/throttle handle 32. A throttle valve position sensor 108 monitors the throttle valve 54 position or angle θ.

The output from these various sensors is preferably provided to an ignition timing control 110 in accordance with the present invention. The ignition timing control is used to control an ignition system which is used to initiate combustion of the air and fuel mixture supplied to each combustion chamber.

As described above, this ignition system includes at least one spark plug 64 associated with each cylinder 44. Where the engine 40 has four cylinders 44, as described above, there are four spark plugs, a first 64-1 corresponding to a first cylinder, a second 64-2 corresponding to a second cylinder, a third 64-3 corresponding to a third cylinder, and a fourth 64-4 corresponding to a fourth cylinder. As described in more detail below, a firing mechanism is associated with the spark plugs 64 for inducing a spark across a gap each spark plug 64 in order to initiate ignition of the fuel and air mixture within a combustion chamber or cylinder.

Figure 2:
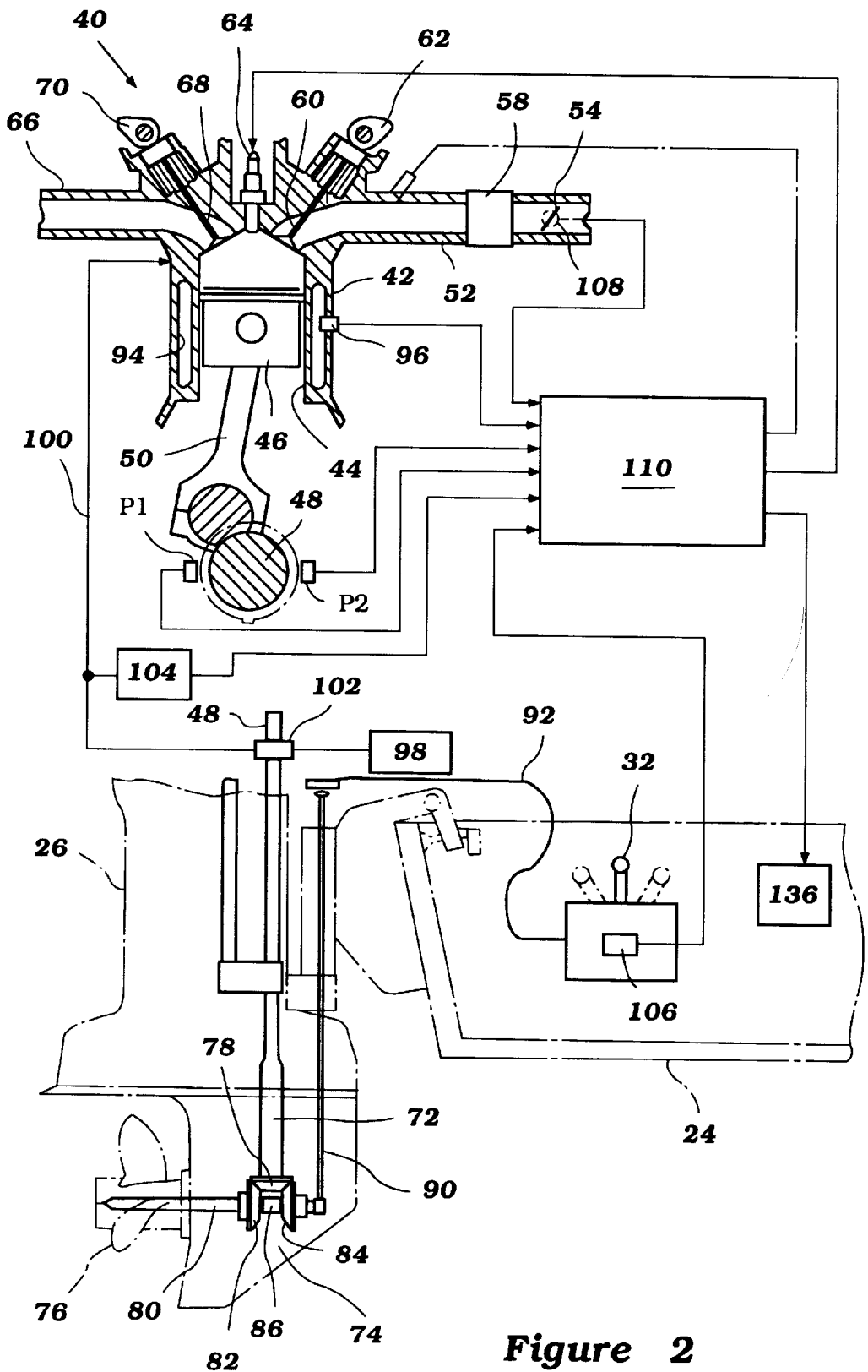
FIG. 2 is a schematic illustrating the interrelationship of an engine of the motor, a transmission of the motor, and an igniting timing control in accordance with the present invention.

FIG. 2 illustrates an electrical system associated with the watercraft 20. The electrical system includes the ignition timing control 110 of the present invention.

The electrical system includes a base or primary power supply. This base power supply preferably comprises a battery 114. As illustrated in FIG. 1, the battery 114 may be conveniently mounted in the watercraft 20.

Figure 3:
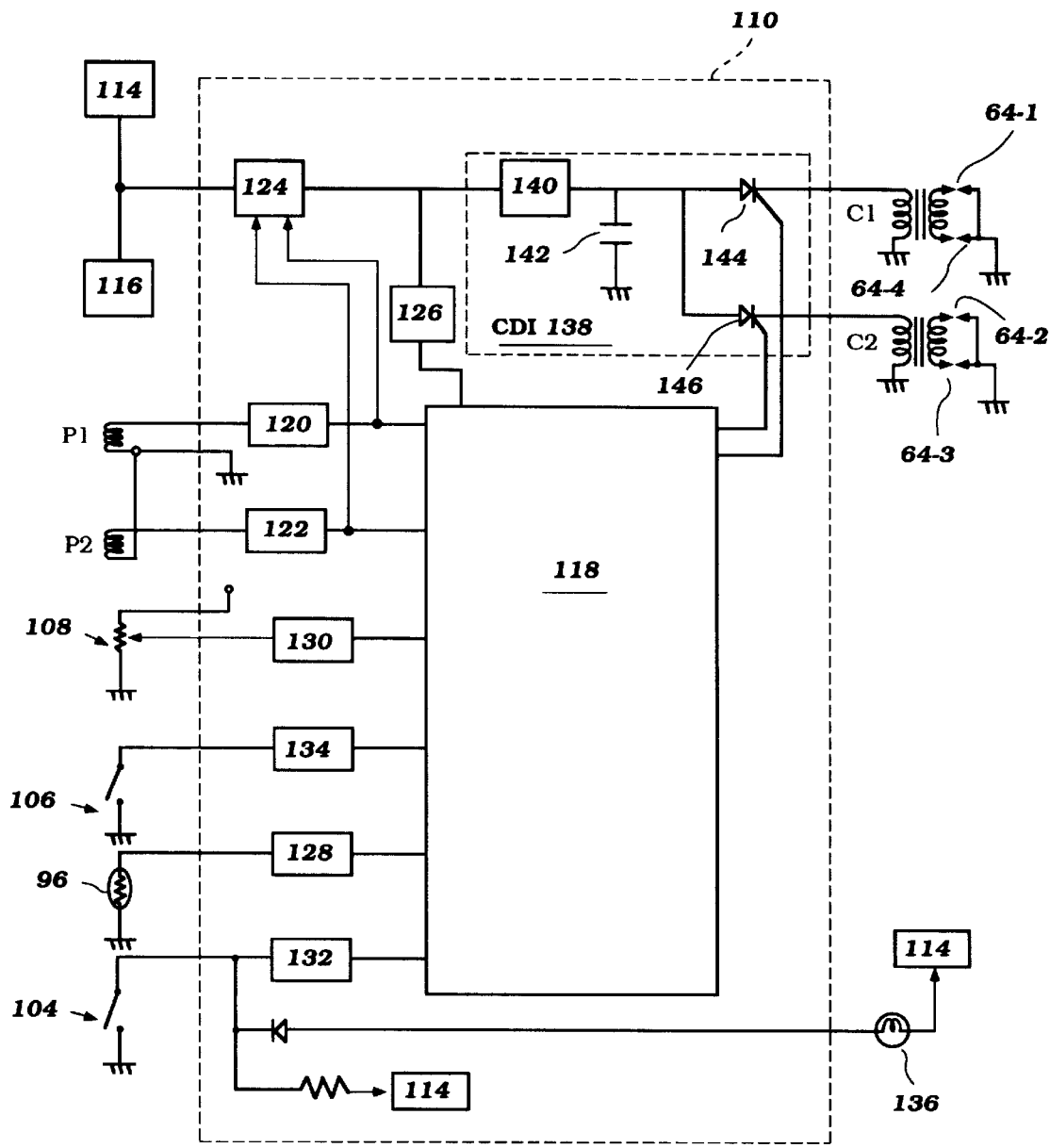
FIG. 3 is a circuit diagram of an electrical system of the outboard motor illustrated in FIG. 1, the electrical system including the ignition timing control in accordance with the present invention.

Referring again to FIG. 3, the electrical system 46 also includes a secondary power supply. This power supply comprises an alternating current generator 116 associated with the engine 40. The generator 116 is preferably driven by the crankshaft 48 of the engine 40. Either the battery 114 or generator 116 provides power to the ignition timing control 110. Though not illustrated, the kill and main switches 38,39 are preferably arranged to selectively permit or prevent power from flowing from these power sources to the ignition timing control 110.

First and second pulser coils P1,P2 are used to generate and output a timing signal. Each pulser coil P1,P2 provides an output signal or spike at a specific time dependent upon engine speed, such as when a member mounted on a flywheel of the engine 40 passes by a pick-up element (see FIG. 2).

In this arrangement, the first pulser coil P1 provides an ignition timing signal corresponding to the spark plugs 64-1,64-4 corresponding to the first and fourth cylinders 44, while the second pulser coil P2 provides such a signal corresponding to the spark plugs 64-2,64-3 corresponding to the second and third cylinders 44. The output of the pulser coils P1,P2 is provided to a computer processing unit (CPU) 118 of the ignition timing control 110 through a respective input circuit 120,122.

Power is provided to the CPU 118 through a non-contact type switch 124 through a constant voltage circuit 126.

The temperature sensor 96 associated with the cooling system outputs temperature data to the CPU 118 through an input circuit 128. Likewise, the output of the throttle valve position from the throttle position sensor 108, the output of the oil pressure switch 104, and the output of the shift position sensor 106 all pass through appropriate input circuits 130,132,134 to the CPU 118.

When insufficient oil pressure is sensed by the switch 104, an alarm or lamp 136 is activated. A load or resistance R is associated with the alarm or lamp circuit, as is well known. The alarm or lamp 136 is preferably mounted at or near the control panel 34 of the watercraft 20.

The ignition system includes a capacitor-discharge ignition (CDI) circuit 138. This circuit 138 includes a control 140 which is powered and which is arranged to control the charging of a charging condenser 142.

The spark plugs 64-1,64-4 corresponding to the first and fourth cylinders 44 are associated with a first ignition coil C1. The spark plugs 64-2,64-3 corresponding to the second and third cylinders are associated with a second ignition coil C2.

The first ignition coil C1 is linked through a first circuit to the charging condenser 142, and the second ignition coil C2 is lined through a similar second circuit The CDI circuit 138 includes a first thyristor 144 positioned along the first circuit, and a second thyristor 146 is positioned along the second circuit. Both thyristors 144,146 are controlled by an output signal from the CPU 118. When the CPU 118 sends an appropriate ignition signal to either of the thyristors 144,146, they open and current is allowed to flow from the condenser 142 through the first or second circuit to the first or second ignition coil C1,C2, at which time a spark is induced at the spark plugs corresponding thereto.

Those of skill in the art will appreciate that in the four-cycle engine, each cycle comprises seven-hundred and twenty degrees of crankshaft rotation In one three-hundred and sixty-degree rotation, each piston moves from top dead center downwardly to bottom dead center in an induction mode, then moves back to top dead center for combustion. In the next three-hundred and sixty degree cycle the piston moves downwardly as driven by the expanding combustion gasses, and then moves upwardly back to top dead center in an exhaust sequence.

In the engine arranged as described above, the piston corresponding to a pair of cylinders (such as the first and fourth cylinders) are generally in the same position, but three-hundred and sixty degrees apart in the operating cycle. In other words, when the piston corresponding to the first cylinder is at top dead center for combustion, the piston corresponding to the fourth cylinder is also at top dead center but in the exhaust sequence. Likewise, the second and third cylinders are so interrelated.

In the arrangement of the present invention, the spark plugs 64-1,64-4 corresponding to the first and fourth cylinders are fired at the same time. The firing of the spark plug corresponding to cylinder which is in the combustion portion of the cycle is effective in initiating combustion, while the simultaneous firing of the spark plug corresponding to the other cylinder is ineffective since it is in exhaust mode. Thus, in each firing of both pairs of spark plugs 64-1/64-4 and 64-2/64-3 only one of the firings is "effective" or "actual" in the sense that it initiates combustion. Of course, the ignition system of the engine 40 may be arranged so that the ignition elements are fired independently.

Figure 4:
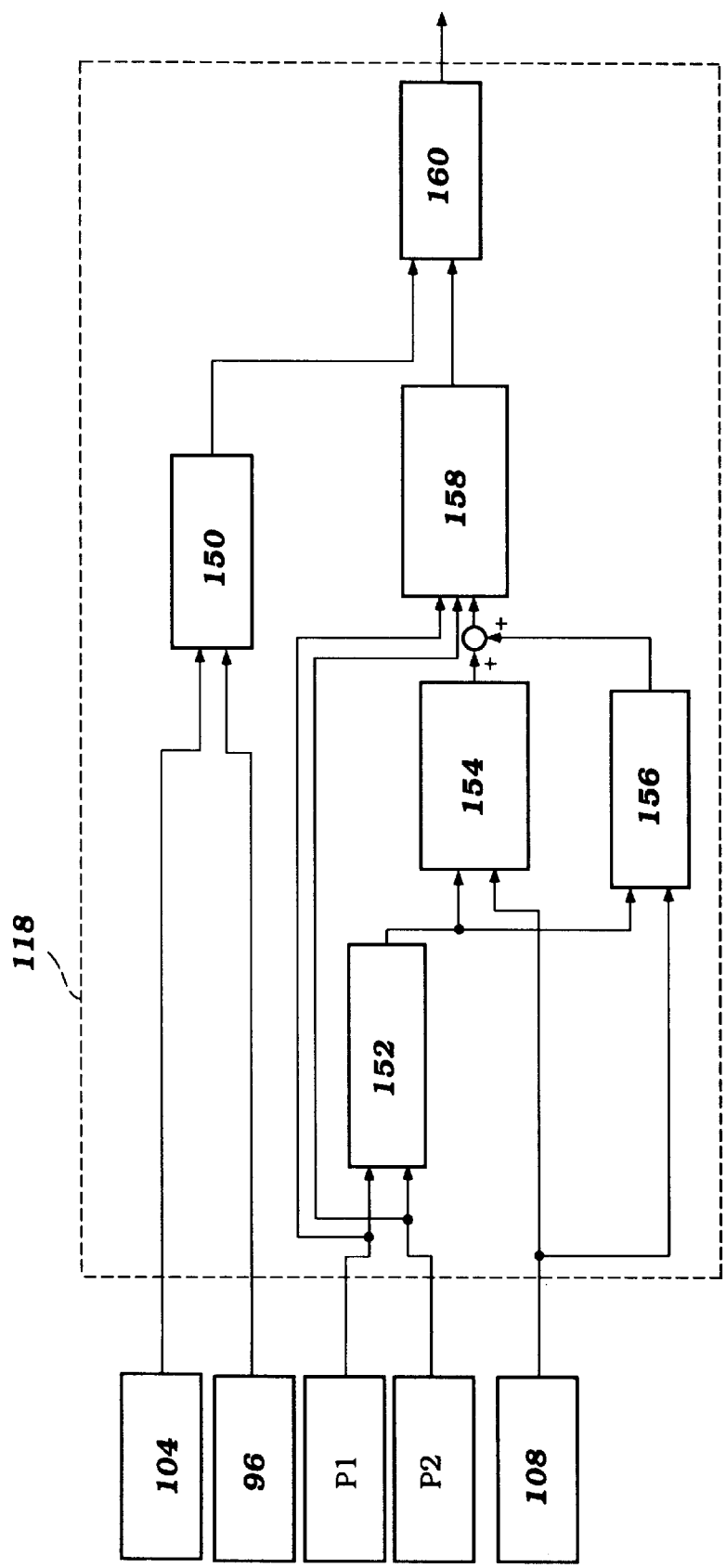
FIG. 4 is a diagram illustrating in greater detail a processing unit of the igniting timing control of the present invention, the processing unit including an acceleration/deceleration ignition timing compensation part.

Certain features of the CPU 118 of the ignition timing control 110 will be described in greater detail with reference next to FIG. 4. As illustrated, the CPU 118 preferably includes a cylinder disabling control portion 150, an engine speed calculating portion 152, an ignition timing map portion 154, an acceleration/deceleration ignition timing compensation part or portion 156, an ignition timing calculation portion 158, and an ignition signal output portion 160. Of course, these portions of the CPU 118 may all be integrated together into one circuit or chip.

The output of the cooling system temperature sensor 96 and oil pressure switch 104 are provided to the cylinder disabling control portion 150. In the event the engine overheats or insufficient oil pressure exists, the cylinder disabling control portion 150 is preferably arranged to provide an ignition timing signal which prevents the firing of the spark plugs 64 corresponding to one or more of the cylinders 44. This ignition signal is supplied to the ignition signal output portion 160 and thereon to the thyristors 144,146.

The output of the pulser coils P1,P2 is provided to the engine speed computation portion 152, which determines the engine speed from the output of the pulser coils P1,P2. The engine speed is provided to the ignition timing map portion 154 for providing base ignition timing data. This timing data is provided to the ignition timing calculation portion 158 which calculates the final ignition timing based on the output from the map, the pulser coils P1,P2, and an output signal from the acceleration/deceleration ignition timing compensation portion 156. The final ignition timing signals (except when overriden by the disabling portion 150) are output to the thyristors 144,146 through the ignition signal output portion 160 of the CPU 118.

The output of the throttle valve position sensor 108 is provided to the acceleration/deceleration ignition timing compensation portion 156, as is the engine speed. The acceleration/deceleration ignition timing compensation portion 156 determines if the engine speed is increasing or decreasing and in certain instances is arranged to output an ignition timing compensation signal to the ignition timing calculation part 158.

Figure 5:
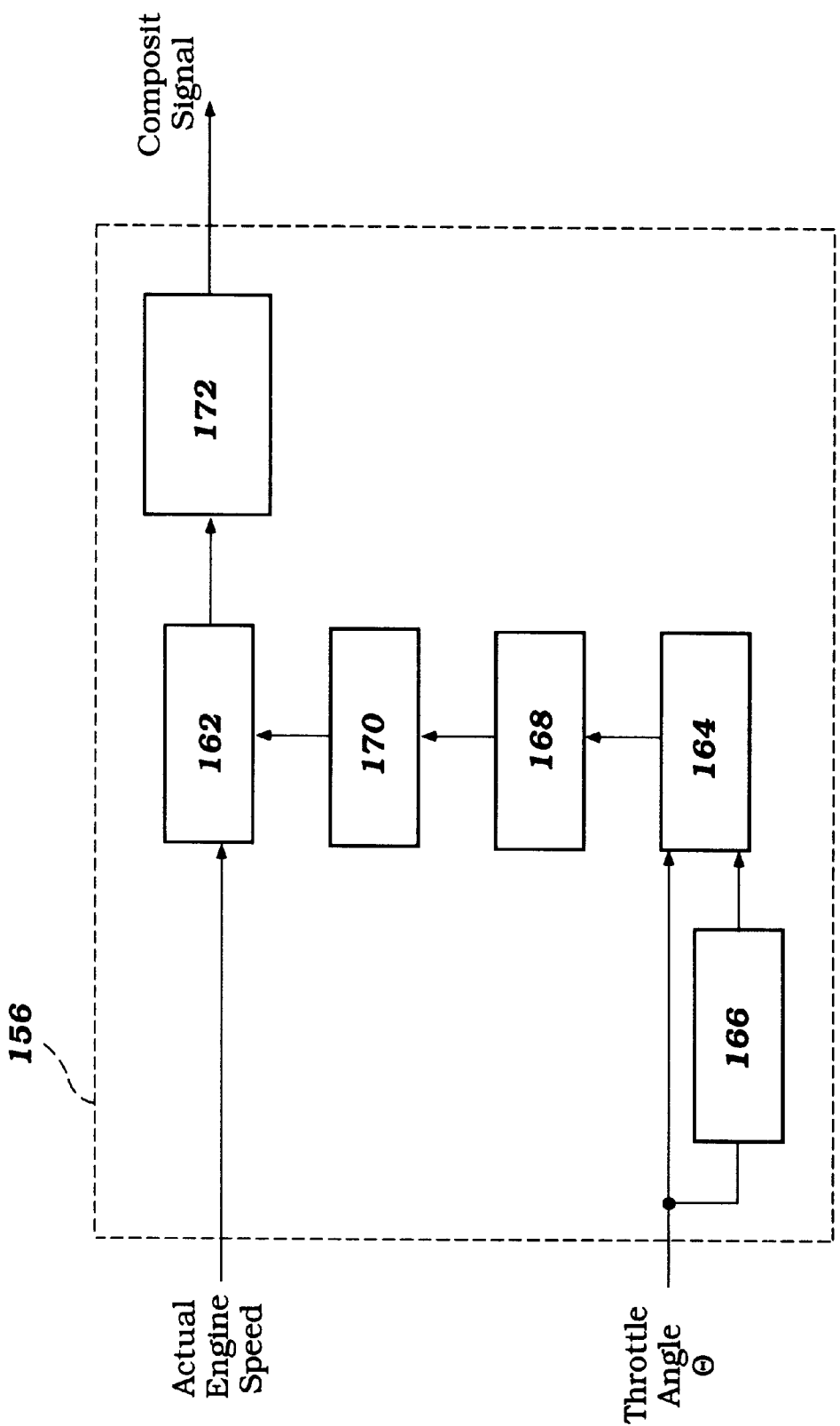
FIG. 5 is a diagram illustrating in greater detail an acceleration/deceleration ignition timing compensation part of the processing unit illustrated in FIG. 4.

FIG. 5 illustrates in more detail the acceleration/deceleration ignition timing compensation portion 156. In this portion of the CPU 118, the actual engine speed is provided to a comparing part 162. On the other hand, the throttle position or angle data is provided to a throttle valve position monitoring part 164, which also obtains throttle angle fluctuation data from a fluctuation rate calculating part 166. The throttle valve position monitoring part 164 outputs a signal to a timing part 168 which is linked to a target speed calculation part 170. The target speed calculation part 170 provides a target engine speed based on the output of the timing part 168.

The comparing part 162 compares the actual engine speed to the target engine speed. A compensation part 172 provides an ignition timing compensation signal based on the result of this comparison. This compensation signal is provided to the ignition timing calculation part 158 for manipulating the timing data from the ignition timing map and providing a modified ignition timing signal.

Figure 6:
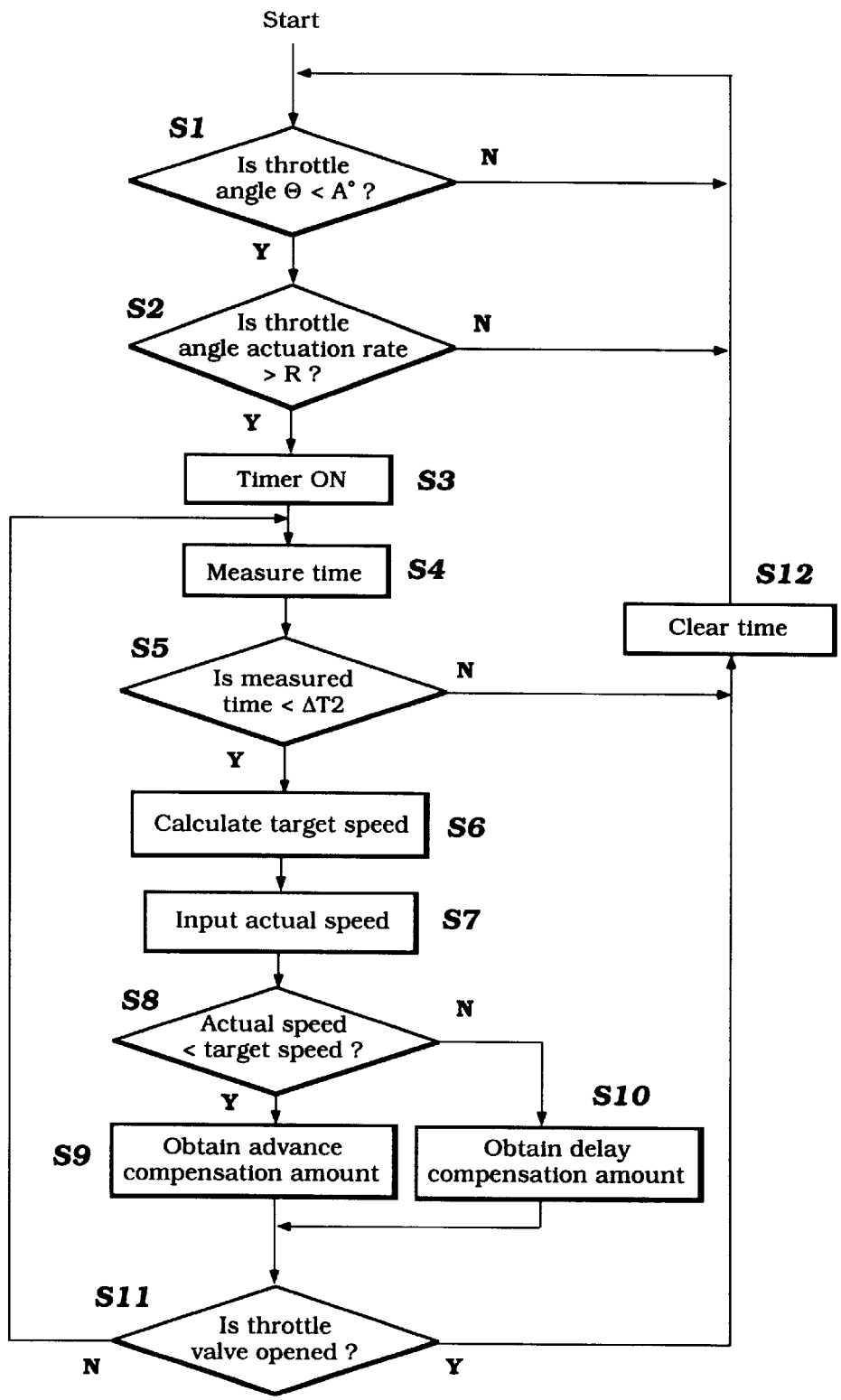
FIG. 6 is a flow chart illustrating an ignition timing compensation function or mode of the acceleration/deceleration ignition timing compensation part of the ignition timing control of the present invention.

FIG. 6 is a flowchart illustrating the operation of the acceleration/deceleration ignition timing compensation portion 156 of the CPU 118. In a first step S1, the throttle valve position monitoring part 164 determines if the throttle angle θ (from the sensor 108) is less than an angle A. If not, the process repeats.

If so, then the throttle valve position monitoring part 164 determines in a step S2 if the engine speed is decelerating faster than a predetermined rate. Preferably, this is determined by comparing a rate in throttle angle fluctuation to a rate R. The throttle angle fluctuation data is provided by the throttle angle fluctuation measuring part 166. If the throttle angle fluctuation rate is smaller than the predetermined amount R, then the process repeats at step S1.

If the throttle angle fluctuation rate is larger than rate R, then an ignition timing compensation mode is initiated. In a step S3 a timer is turned on the by timing part 168. In a step S4 an elapsed or measured time computed by the timer is compared against a predetermined time. If the elapsed time is greater than a predetermined time ΔT2, then it is determined that the compensation mode is to be ended and in a step S12 the timer is cleared and the process repeats at step S1. The time ΔT2 is preferably a sufficiently long time for the engine speed to achieve an idle speed considering that the engine speed reduces more slowly than the throttle valve angle.

If the time elapsed is less than ΔT2, then in a step S6, a target engine speed is calculated by the calculation part 170. This speed may be obtained from a map of desired engine speeds at varying conditions. In step S7, this target speed is compared by the comparing part 162 against the actual engine speed.

In step S8, if the actual speed more than the target speed, then in a step S10 the compensating part 172 provides an ignition delay compensating amount By the term "delay" it is meant that the timing of the firing of the spark plug 64 is later than normal (which tends to slow the speed of the engine). If the actual speed is less than the target speed in step S8, then in a step S9 the compensating part 172 provides an ignition advance compensating amount. By the term "advance" it is meant that the timing of the firing of the spark plug 64 is earlier than normal (which tends to increase the speed of the engine).

In step S11, it is then determined if the throttle valve is being moved towards its open position. If so, then it is determined the compensation mode should end and the timer is cleared in step S12 and the process repeats to step S1. If not, then the elapsed time is measured again in step S4 and the process repeats from there. In other words, the control function is aborted or ended in the event the operator starts moving the throttle valve back towards the opposite or open position.

In the above-described arrangement, the control may be arranged so that the condition of engine deceleration is determined directly by comparing the engine speed over time. For example, the engine speed as measured by the output of the pulser coils P1,P2 may be compared at time intervals for calculating the rate of change in engine speed.

Figure 7:
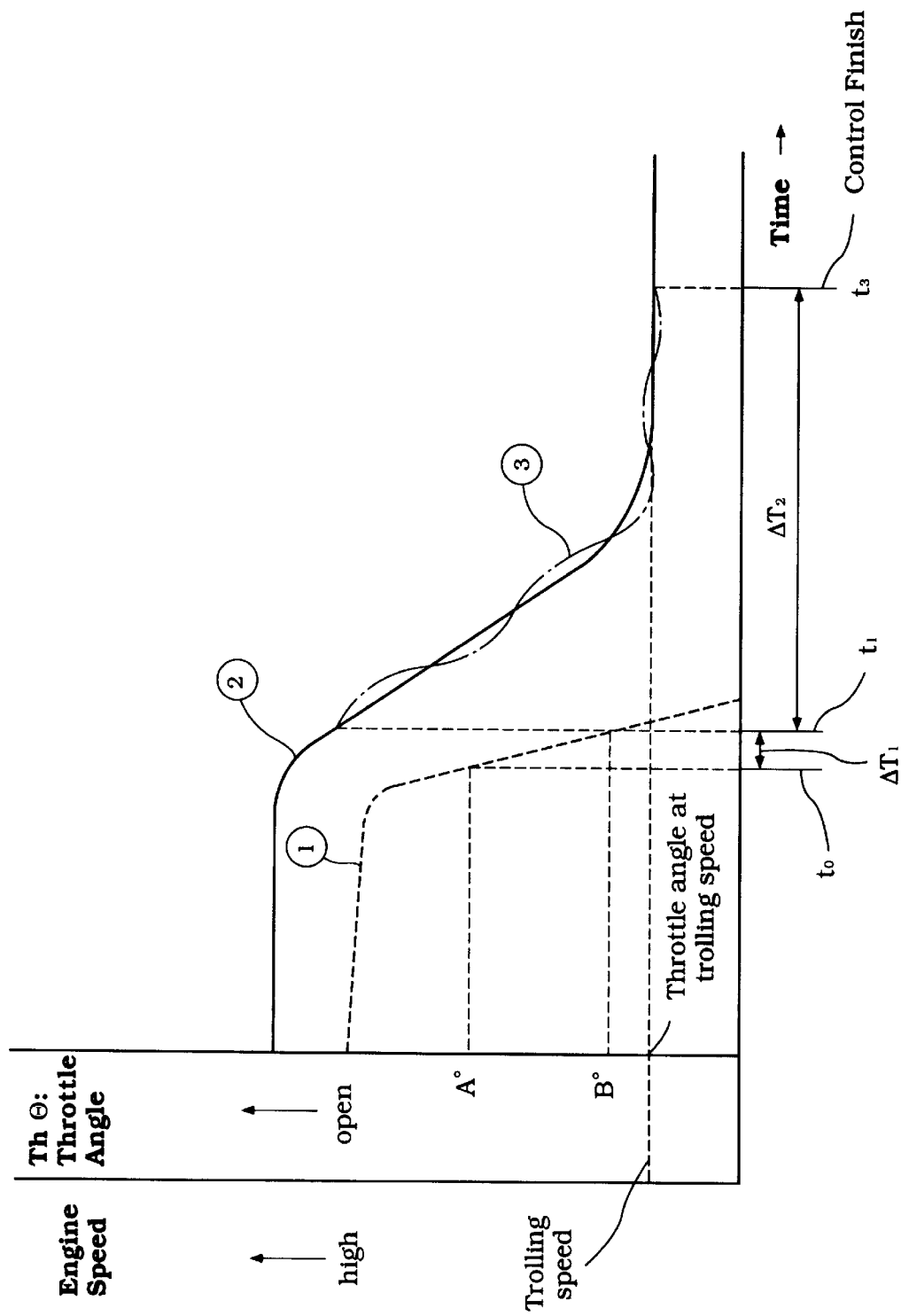
FIG. 7 is a graph illustrating throttle opening angle and engine speed versus time during an ignition timing compensation mode and when the mode ends upon a predetermined amount of time elapsing.

FIG. 7 is a graph illustrating operation of the ignition control as described above, where the throttle angle is illustrated by line 1, the target engine speed by line 2 and actual engine speed by line 3. When the throttle angle fluctuates sufficiently (i.e. greater than rate R), then the timer starts at t1 and continues until t3, which is a time exceeding ΔT2. As illustrated, throttle angle fluctuation measurement starts when the throttle valve angle is less than A°. If the throttle angle moves (towards a closed position) to B° during a time ΔT1, then it is determined that the throttle valve 54 has fluctuated by an amount greater than amount R.

The ignition timing control 110 of the present invention is arranged so that the compensation ignition timing signal provided by the acceleration/deceleration detection portion 156 of the CPU 118 alters the basic ignition timing signal or data to provide an ignition timing signal which results in an engine speed which is very close to a target speed. Preferably, the above stated control loop is performed several times during the deceleration condition, with multiple engine target speeds being compared to the actual engine speed. In this manner, the actual engine speed is corrected often and remains very close to the target speed.

Figure 8:
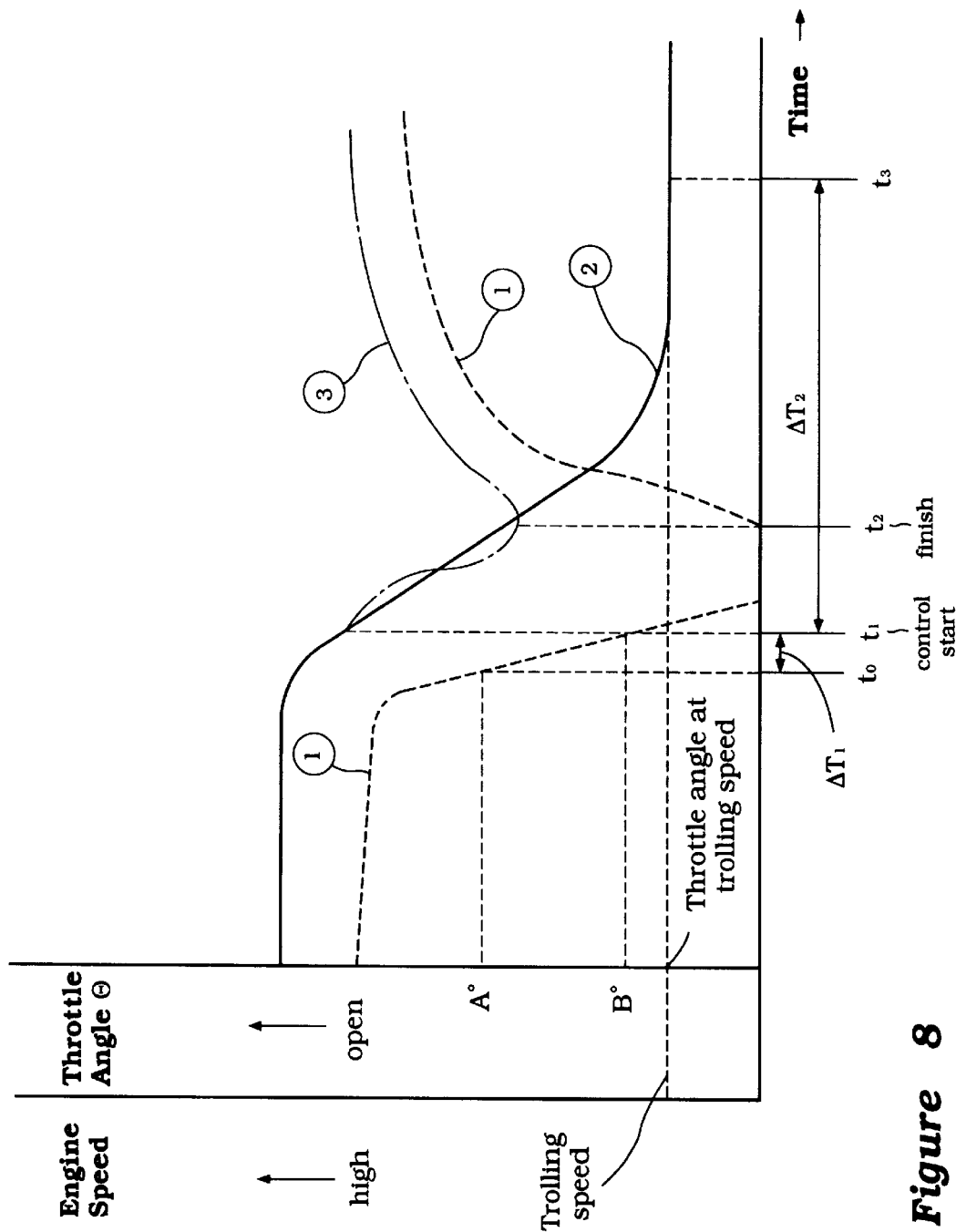
FIG. 8 is a graph illustrating throttle opening angle and engine speed versus time during an ignition timing compensation mode and when the mode ends upon opening of a throttle valve.
Figure 9:
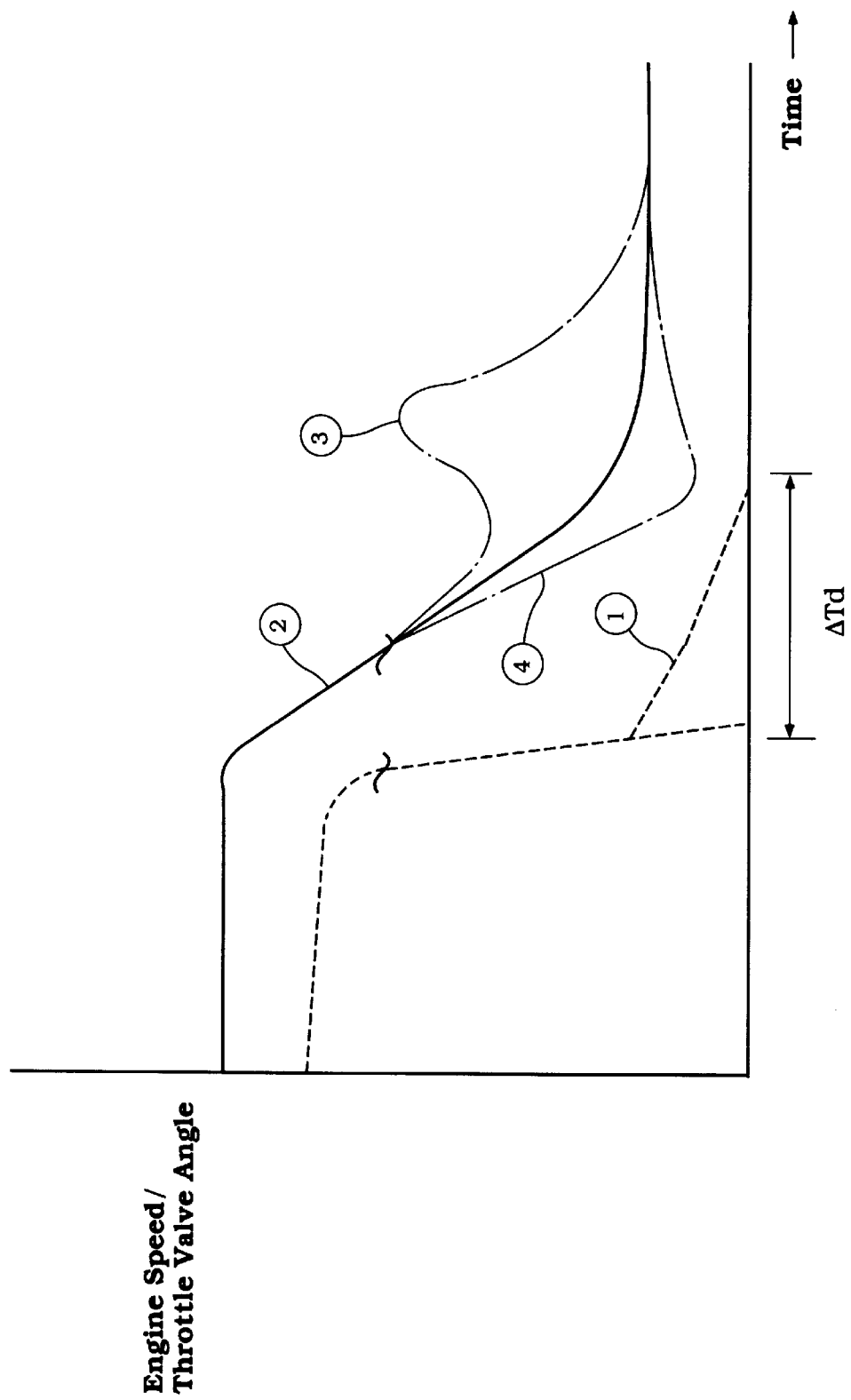
FIG. 9 is a graph illustrating throttle opening angle and engine speed versus time for an engine in accordance with the prior art.

FIG. 8 illustrates the situation when the operator re-opens the throttle (at time t2) before the measured elapsed time exceeds time ΔT2. In this situation, the control starts at time t1 and lasts only until a time t2 which is less than ΔT2. Once the throttle valve 54 is moved back towards its open position at time t2, in accordance with step S11, the timer is reset and the process repeats. At this time, the engine speed again increases as the throttle control is opened.

Advantageously, the ignition timing control of the present invention is arranged to detect a condition of rapid engine deceleration and to manipulate the ignition firing timing during the deceleration time to control the engine speed. In this manner, the engine speed can be rapidly and accurately reduced without the engine speed falling excessively and the engine stalling, or the engine speed not reducing quickly enough and later shifting of the transmission being harsh or damaging.

Of course, the foregoing description is that of preferred embodiments of the invention, and various changes and modifications may be made without departing from the spirit and scope of the invention, as defined by the appended claims.

What is claimed is:

1. A method of controlling an ignition of an engine powering a water propulsion device, the method comprising the steps of determining if an actual speed of said engine is decreasing at a rate greater than a predetermined rate, and if so, operating said engine in an ignition timing compensation mode to control the actual engine speed during deceleration, said step of operating said engine in said ignition timing compensation mode includes setting at least one target engine speed, comparing the actual engine speed to said target engine speed, and manipulating a firing timing of said ignition by advancing an actual ignition firing timing of said ignition if the actual engine speed is less than said target engine speed and delaying said actual ignition firing timing if the actual engine speed exceeds said target engine speed.

2. The method in accordance with claim 1, wherein said engine includes a throttle valve associated with an air intake system and said step of determining if said speed of said engine is decreasing comprises determining a rate of change in position in said throttle valve.

3. The method in accordance with claim 1, wherein said step of determining if said speed of said engine is decreasing comprises comparing speeds of said engine at predetermined intervals.

4. The method in accordance with claim 3, wherein at least one pulser coil is associated with said engine for providing an output signal dependent upon a speed of said engine and wherein said speed of said engine is determined from said output of said at least one pulser coil.

5. The method in accordance with claim 1, wherein said step of operating said engine in an ignition timing compensation mode is ceased when a throttle valve associated with said engine is moved towards an open position.

6. The method in accordance with claim 1, wherein said step of operating said engine in an ignition timing compensation mode is ceased after a predetermined time has elapsed.

7. The method in accordance with claim 1, wherein a base ignition firing timing of said ignition is provided from a map and said step of manipulating comprises altering said base ignition firing timing.

8. An ignition timing control for an engine having an ignition, said igniting timing control comprising a sensor and a control, said control including a processor, said sensor providing an output dependent upon a speed of said engine to said processor of said control, said control arranged to provide an ignition firing timing signal to said ignition of said engine based at least in part upon said speed of said engine, said processor determining if said speed of said engine is decreasing faster than a predetermined rate of speed, and if so, operating said engine in an ignition timing compensation mode in which said control provides a target engine speed, compares said target engine speed to said speed of said engine, advances said ignition firing timing signal if said speed of said engine is less than said target speed and delays said ignition firing timing signal if said speed of said engine is greater than said target speed.

9. The ignition timing control in accordance with claim 8, wherein said engine has an output shaft arranged to drive a water propulsion device.

10. The ignition timing control in accordance with claim 8, wherein said engine includes at least one combustion chamber and said ignition includes at least one spark plug corresponding to said combustion chamber, said ignition firing timing signal utilized to initiate a spark at said spark plug.

11. The ignition timing control in accordance with claim 8, wherein said control includes a timer for controlling the duration of said ignition timing compensation mode.

12. The ignition timing control in accordance with claim 8, wherein said control includes a map of ignition firing timing signals based on engine speed, said control being arranged to output an ignition firing timing signal to control said ignition of said engine based on said map when said condition of deceleration does not exist.

13. The ignition timing control in accordance with claim 12, wherein said engine includes a throttle valve and said ignition timing compensation mode ends when said throttle valve is moved towards its open position.

14. A method of controlling an ignition of an engine powering a water propulsion device, said engine including a throttle valve associated with an air intake system, the method comprising the steps of determining if a speed of said engine is decreasing at greater than a predetermined rate by determining a rate of change in position of said throttle valve, and, if said speed of said engine is decreasing at a rate greater than said predetermined rate, operating said engine in an ignition timing compensation mode, said step of operating said engine in said ignition timing compensation mode including the steps of setting at least one target engine speed during a period of engine deceleration, comparing said speed of said engine to said target engine speed, and manipulating an ignition firing timing by advancing said ignition firing timing of said ignition if said speed of said engine is less than said target speed and delaying said ignition firing timing of said ignition if said speed of said engine exceeds said target speed.

15. The method in accordance with claim 14, wherein said step of determining if said speed of said engine is decreasing comprises comparing speeds of said engine at predetermined intervals.

16. The method in accordance with claim 14, wherein said step of operating said engine in said ignition timing compensation mode is ceased after a predetermined time has elapsed.

17. A method of controlling an ignition of an engine powering a water propulsion device comprising the steps of determining if a speed of said engine is decreasing at greater than a predetermined rate, and, if so, operating said engine in an ignition timing compensation mode, said step of operating said engine in said ignition timing compensation mode ceasing when a throttle valve associated with said engine is moved towards an open position, said step of operating said engine in said ignition timing compensation mode includes the steps of setting at least one target engine speed during a period of deceleration, comparing said speed of said engine to said target engine speed, and manipulating an ignition firing timing of said ignition by advancing said ignition firing timing of said ignition if said speed of said engine is less than said target speed and delaying said ignition timing of said ignition if said speed of said engine exceeds said target speed.

18. The method in accordance with claim 17, wherein said step of operating said engine in said ignition timing compensation mode is ceased after a predetermined time has elapsed.

19. A method of controlling an ignition of an engine powering a water propulsion device comprising the steps of determining if a speed of said engine is decreasing at greater than a predetermined rate, and, if so, operating said engine in an ignition timing compensation mode, said step of operating said engine in said ignition timing compensation mode includes the steps of setting at least one target engine speed during a period of deceleration, comparing said speed of said engine to said target engine speed, and manipulating a base ignition firing timing of said ignition to alter said base ignition firing timing, said base ignition firing timing being provided from a map, said manipulating step comprising advancing an ignition firing timing of said ignition if said speed of said engine is less than said target speed and delaying said ignition firing timing if said speed of said engine exceeds said target speed.

20. The method in accordance with claim 19, wherein said step of operating said engine in said ignition timing compensation mode is ceased after a predetermined time has elapsed.

21. An ignition timing control for an engine having an ignition, said ignition timing control comprising a sensor providing an output dependent upon a speed of said engine, a control arranged to provide an ignition firing timing signal for said ignition of said engine, said control including a map of ignition timing signals based on engine speed and a processor to determine if said speed of said engine is decreasing faster than a predetermined rate of speed, and, if so, operating said engine in an ignition timing compensation mode in which said control provides a target engine speed, compares said target engine speed to said speed of said engine, advances said ignition firing timing signal if said speed of said engine is less than said target speed and delays said ignition firing timing signal if said speed of said engine is greater than said target speed, and if said speed of said engine is not decreasing faster than said predetermined rate of speed, said control provides an output of said ignition timing signal from said map.

22. The ignition timing control in accordance with claim 21, wherein said engine includes a throttle valve and said ignition timing compensation mode ends when said throttle valve is moved towards its open position.

23. The ignition timing control in accordance with claim 21, wherein said engine has an output shaft arranged to drive a water propulsion device.

24. The ignition timing control in accordance with claim 21, wherein said engine includes at least one combustion chamber and said ignition includes at least one spark plug corresponding to said combustion chamber, said ignition firing timing signal utilized to initiate a spark at said spark plug.

25. The ignition timing control in accordance with claim 21, wherein said control includes a timer for controlling a duration of said ignition timing compensation mode.

\* \* \* \* \*